US012684401B2

(12) United States Patent
Somashekar et al.

(10) Patent No.: US 12,684,401 B2
(45) Date of Patent: Jul. 14, 2026

(54) USER EQUIPMENT BASED CONTROL FOR WI-FI AND CELLULAR BASED CONNECTIVITY

(71) Applicant: T-Mobile USA, Inc., Bellevue, WA (US)

(72) Inventors: Sharath Somashekar, Overland Park, KS (US); Mason Tyler Bouffard, Seattle, WA (US); Oscar R. Cummings, Lynwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 348 days.

(21) Appl. No.: 18/351,708

(22) Filed: Jul. 13, 2023

(65) Prior Publication Data

US 2025/0024308 A1     Jan. 16, 2025

(51) Int. Cl.
| | |
|---|---|
| *H04W 28/02* | (2009.01) |
| *H04W 24/08* | (2009.01) |
| *H04W 76/16* | (2018.01) |
| *H04W 88/06* | (2009.01) |

(52) U.S. Cl.
CPC ....... *H04W 28/0236* (2013.01); *H04W 24/08* (2013.01); *H04W 76/16* (2018.02); *H04W 88/06* (2013.01)

(58) Field of Classification Search
CPC ................................................. H04W 28/0236
See application file for complete search history.

(56) References Cited

U.S. PATENT DOCUMENTS

| | | | | |
|---|---|---|---|---|
| 2014/0293959 A1* | 10/2014 | Singh | .................... | H04W 80/10 |
| | | | | 370/329 |
| 2019/0281506 A1* | 9/2019 | Chiang | ............... | H04L 65/1069 |
| 2022/0167187 A1* | 5/2022 | Jia | ......................... | H04W 48/02 |
| 2022/0182873 A1* | 6/2022 | Anand | .................. | H04W 76/15 |

* cited by examiner

*Primary Examiner* — Jason E Mattis
(74) *Attorney, Agent, or Firm* — Lee & Hayes, P.C.

(57)     ABSTRACT

Techniques for selecting a wireless connection based on network metrics are discussed herein. For example, user equipment (UE) can be connected to a Wi-Fi network. The UE may test the Wi-Fi connection to determine metrics associated with the Wi-fi connection. The UE may compare the metrics to a speed and/or bandwidth threshold. If the Wi-fi connection speed is below a threshold, the UE may determine metrics associated with a cellular connection to determine whether to switch to a different cellular connection. If a first metric of the candidate cellular connection is above a threshold (e.g., a power level threshold), the UE can determine a speed or bandwidth of the connection. If the speed or bandwidth is above a threshold, the UE can attach to the cellular connection and can send and/or receive data using the newly established connection.

20 Claims, 6 Drawing Sheets

200

DEVICE 300

MEMORY 304

METRICS COMPONENT 110

SELECTION COMPONENT 112

UE STATE COMPONENT 306

RECENT CONNECTION COMPONENT 308

OTHER UE METRICS COMPONENT 310

MACHINE LEARNED COMPONENT 312

SCHEDULING COMPONENT 314

PROCESSOR(S) 302

REMOVABLE STORAGE 316

NON-REMOVABLE STORAGE 318

INPUT DEVICE(S) 320

OUTPUT DEVICE(S) 322

TRANSCEIVER(S) 324

UE 102

500

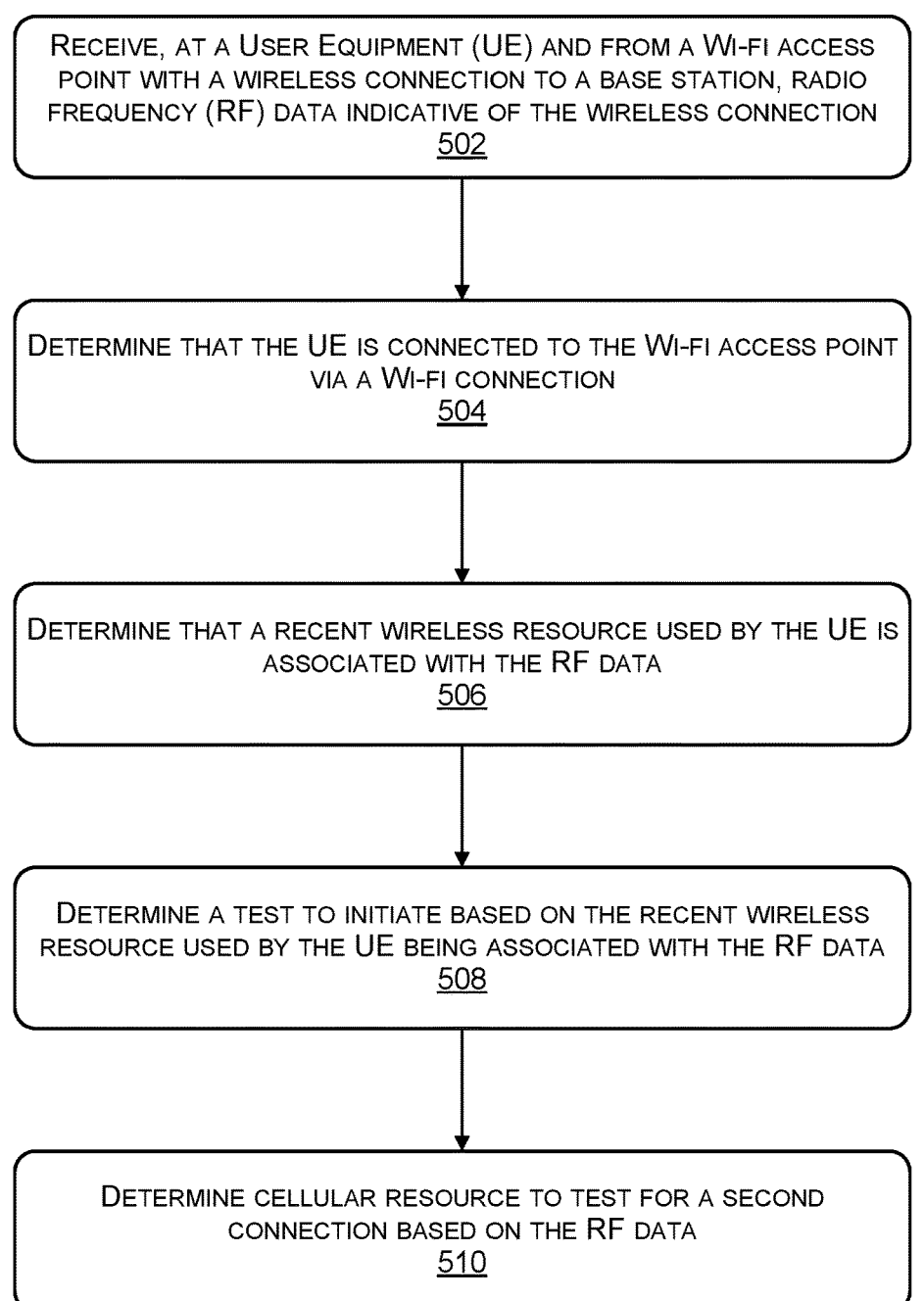

RECEIVE, AT A USER EQUIPMENT (UE) AND FROM A WI-FI ACCESS POINT WITH A WIRELESS CONNECTION TO A BASE STATION, RADIO FREQUENCY (RF) DATA INDICATIVE OF THE WIRELESS CONNECTION
502

DETERMINE THAT THE UE IS CONNECTED TO THE WI-FI ACCESS POINT VIA A WI-FI CONNECTION
504

DETERMINE THAT A RECENT WIRELESS RESOURCE USED BY THE UE IS ASSOCIATED WITH THE RF DATA
506

DETERMINE A TEST TO INITIATE BASED ON THE RECENT WIRELESS RESOURCE USED BY THE UE BEING ASSOCIATED WITH THE RF DATA
508

DETERMINE CELLULAR RESOURCE TO TEST FOR A SECOND CONNECTION BASED ON THE RF DATA
510

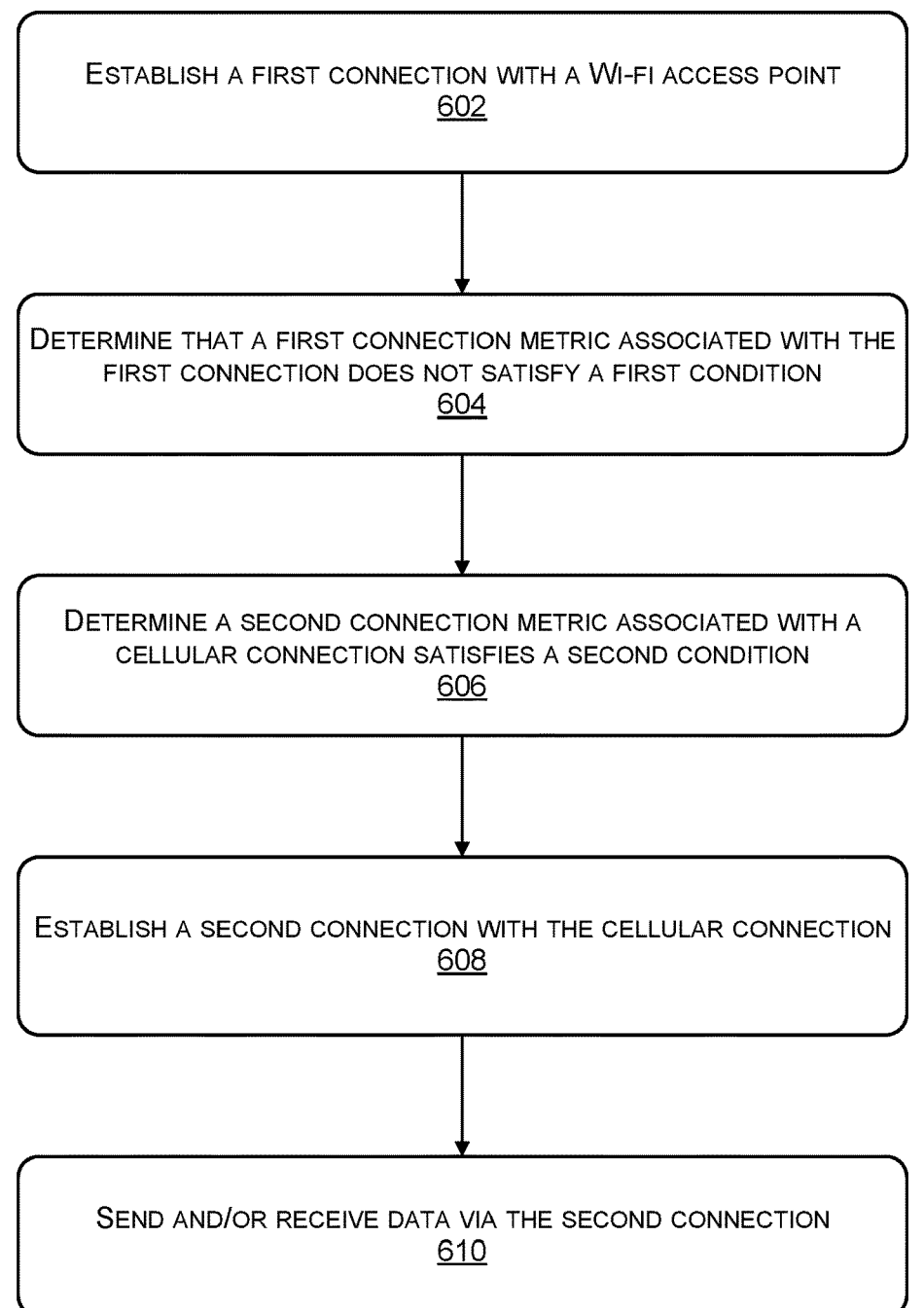

ESTABLISH A FIRST CONNECTION WITH A WI-FI ACCESS POINT
602

DETERMINE THAT A FIRST CONNECTION METRIC ASSOCIATED WITH THE FIRST CONNECTION DOES NOT SATISFY A FIRST CONDITION
604

DETERMINE A SECOND CONNECTION METRIC ASSOCIATED WITH A CELLULAR CONNECTION SATISFIES A SECOND CONDITION
606

ESTABLISH A SECOND CONNECTION WITH THE CELLULAR CONNECTION
608

SEND AND/OR RECEIVE DATA VIA THE SECOND CONNECTION
610

FIG. 6

USER EQUIPMENT BASED CONTROL FOR WI-FI AND CELLULAR BASED CONNECTIVITY

BACKGROUND

Cellular communication devices, often referred to as mobile devices or user equipment (UE), use network radio access technologies (RATs) to communicate wirelessly with geographically distributed cellular base stations. Long-Term Evolution (LTE) is an example of a widely implemented radio access technology that is used in Fourth Generation (4G) communication systems. New Radio (NR) is a newer radio access technology that is used in Fifth Generation (5G) communication systems. Legacy RATs include those of Third Generation (3G) and Second Generation (2G) communication systems. Standards for LTE and NR radio access technologies, as well as RATs for 3G systems, have been developed by the 3rd Generation Partnership Project (3GPP) for use by wireless communication carriers.

In addition, UE often use connect to Local Area Networks via non-3GPP protocols such as Wi-Fi. Such Wi-Fi networks are often used in homes, offices, or business to provide access to networks such as the Internet. In some cases, UEs prioritize connections to a Wi-Fi network as data transferred over a Wi-Fi connect may not count towards a data limit for a subscriber plan. However, a Wi-Fi network may be congested or may not have sufficient bandwidth for a particular UE.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates an example process of UE operations based on radio frequency data received from a Wi-Fi access point.

FIG. 6 illustrates another example process for determining connection metrics and selecting a wireless connection.

DETAILED DESCRIPTION

Figure 1:
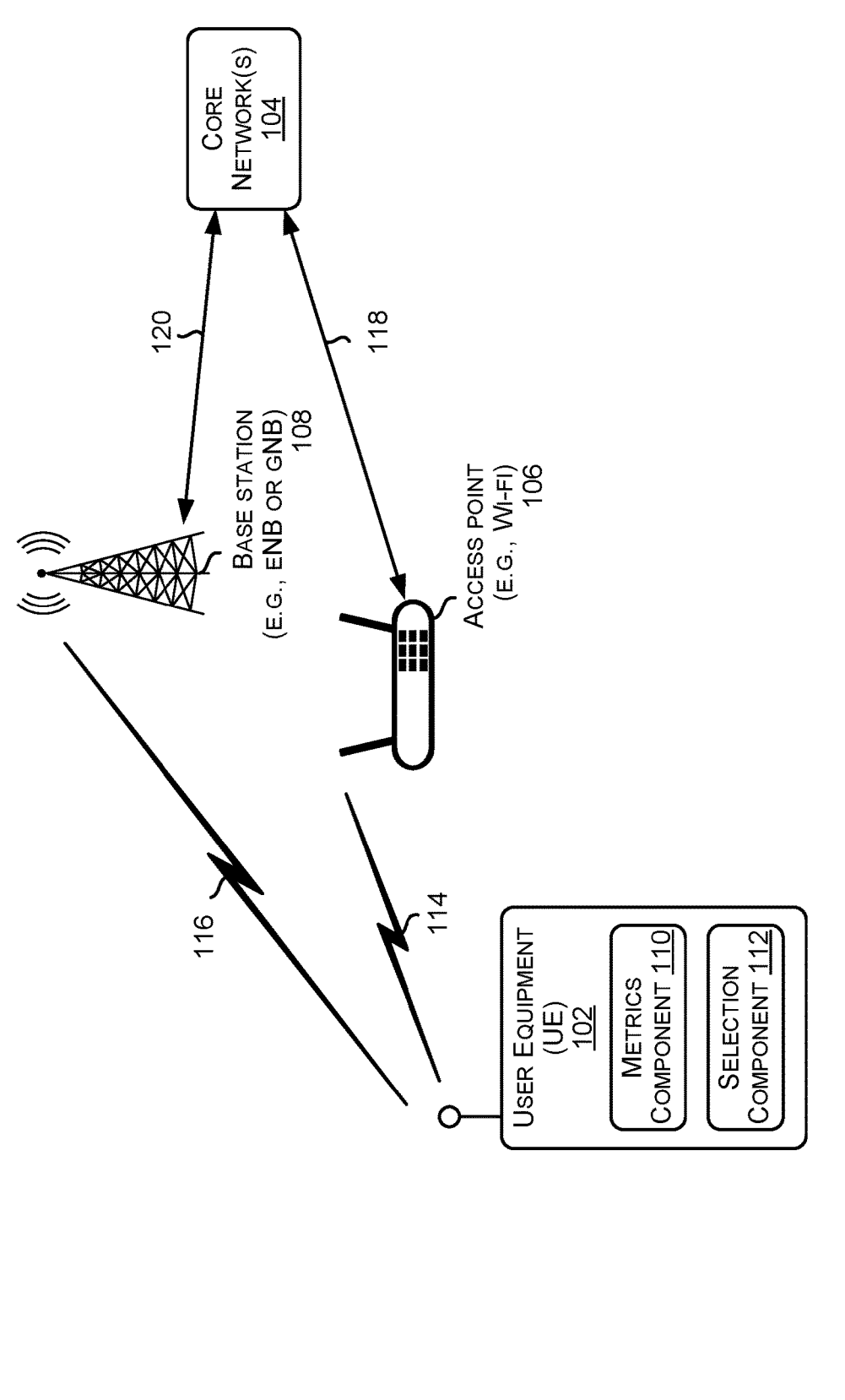
FIG. 1 shows an example network environment in which a user equipment (UE) can connect to a core network via a Wi-Fi access point and/or via a base station.

Techniques for selecting a wireless connection based on network metrics are discussed herein. For example, user equipment (UE), such as a smartphone, may be connected to a Wi-Fi network. In some cases, the UE may test the Wi-Fi connection to determine metric(s) associated with the Wi-fi connection. In some examples, the UE may compare the metric(s) to a threshold, such as a speed or bandwidth threshold. If the Wi-fi connection speed is below a threshold (or a latency is above a threshold), the UE may determine metric(s) associated with a cellular connection to determine whether to switch to a different cellular connection. For example, the UE may access a list of recently accessed cellular resources (e.g., wireless bands of a Fourth Generation (4G) or Fifth Generation (5G) network) and can evaluate or otherwise test a candidate network. If a first metric of the candidate cellular connection is above a threshold (e.g., a power level threshold), the UE can determine a speed or bandwidth of the connection. If the speed or bandwidth is above a threshold, the UE can attach to the cellular connection and can send and/or receive data using the newly established connection.

In some examples, a network utility for determining network metrics can be located at different locations (or located within different devices) in a network. For example, the UE can include a metrics component that can include instructions or operations to determine metrics associated with one or more wireless resources. In some examples, a metrics component can query a counterpart function in the Wi-fi access point, a base station, an edge compute device, or a component or server associated with a core network. In some examples, the UE can communicate with different utilities in different locations (or devices) based on the configuration of the UE, different UE/network configurations or characteristics, connection characteristics, and the like. For example, in a case where a Wi-fi access point is connected to a core network via a base station (e.g., an eNB or a gNB), the UE can send a signal to a program operating in the Wi-fi access point to determine a local congestion level (e.g., a speed and/or latency of Wi-fi network). In some examples, this can reduce signaling within the edge network or core network, which can improve overall efficiency of a network.

In some examples, a UE can send a signal to a base station to determine connection metrics associated with a local air interface. In some examples, this can reduce signaling within the core network and can provide a more complete look at the aggregated performance of the Wi-fi interface and the base station interface.

In some examples, a UE can send a signal to a component associated with or otherwise within a core network to determine connection metrics associated with the core network. This can provide the most detailed metrics of the connection but can require the most signaling and data exchange.

In some examples, the metrics component can use heuristics or machine learned models to set thresholds, such as a speed/bandwidth/latency threshold for the Wi-fi connection, a power threshold for a candidate cellular connection, and/or a speed/bandwidth threshold for the candidate cellular connection. In some examples, the threshold(s) can be based at least in part on whether the Wi-fi access point is connected to core network via a wired connection or via a wireless connection through a base station, a type of wireless connection between the Wi-fi access point and the base station, a type of a most recently accessed cellular connection, UE state data (e.g., battery levels, data type (e.g., voice, data, gaming, and the like), screen state, movement data, etc.), a connection state of other UEs connected to a Wi-fi access point (e.g., indicative of whether other UEs connected to the Wi-fi access point are congested), subscriber data (e.g., data priorities, cellular data levels left within a time period, and the like), time of day, location data, roaming status, dual connectivity capability, and the like).

In some examples, the techniques discussed herein can be implemented in the context of protocols associated with one or more of 3G, 4G, 4G LTE, 5G protocols. In some examples, the network implementations can support standalone architectures, non-standalone architectures, dual connectivity, carrier aggregation, etc. Example implementations are provided below with reference to the following figures.

FIG. 1 shows an example network environment 100 in which a user equipment (UE) 102 can connect to a core network 104 via a Wi-Fi access point 106 and/or via a base station 108.

In some examples, the UE 102 can connect to a telecommunication network (e.g., the core network 104) to engage in communication sessions for voice calls, video calls, messaging, data transfers, and/or any other type of communication. The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

The UE 102 can include various components, such as a metrics component 110 and/or a selection component 112. As will be discussed throughout this disclosure, the metrics component 110 can measure, evaluate, test, or otherwise determine different metrics associated with one or more connections 114 and/or 116 between the UE 102 and the access point 106 or the UE 102 and the base station 108. And as further discussed herein, the type of metrics and what portions of the network they may measure or represent can depend on the location of the counterpart program responding to the metrics component 110 from different locations/ devices from the environment 100. By way of example and without limitation, the metrics component 110 can determine one or more of a speed, bandwidth, latency, jitter, delay, signal to noise ratio (SNR), received signal strength indicator (RSSI), and the like, although other metrics (or combination of metrics) can be determined.

As will be discussed throughout this disclosure, in some examples, the selection component 112 can determine to stay connected via the connection 114 (e.g., when metrics indicate that performance of the connection 114 meets or exceeds one or more thresholds or satisfies one or more conditions). In some examples, the selection component 112 can determine to switch to another connection that is associated with better performance or metrics (e.g., the selection component 112 can control the UE 102 to establish the connection 116 instead of or in addition to the connection 114). Additional details are discussed throughout this disclosure.

The access point 106 can be a Wi-fi access point capable of providing sending and/or receiving data to and/or from the UE 102 in accordance with 802.XX protocols, although other protocols can be used. In some examples, the access point 106 can be a Fourth Generation (4G) or a Fifth Generation (5G) base station.

The base station 108 can include, in some examples, one or more base stations that use LTE radio access technologies, such as LTE evolved Node Bs (eNBs). In some examples, the base station 108 can include one or more base stations that use 5G NR radio access technologies, such as 5G gNBs. In some examples, the base station 108 can represent another Wi-fi access point servicing the same area as the Wi-fi access point 106.

In some examples, the access point 106 can be communicatively coupled to the core network(s) 104 via a connection 118 and the base station 108 can be communicatively coupled to the core network(s) 104 via a connection 120. The core network(s) 104 can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/ Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The UE 102 can wirelessly connect to one or more access points 106 or other base stations 108, and in turn be connected to the core network 104 via the base stations or other access points. In some examples, the core network 104 can be a packet core network of an LTE network, which may be referred to as an Evolved Packet Core (EPC). In other examples, the core network 104 can be a 5G core network.

Figure 2:
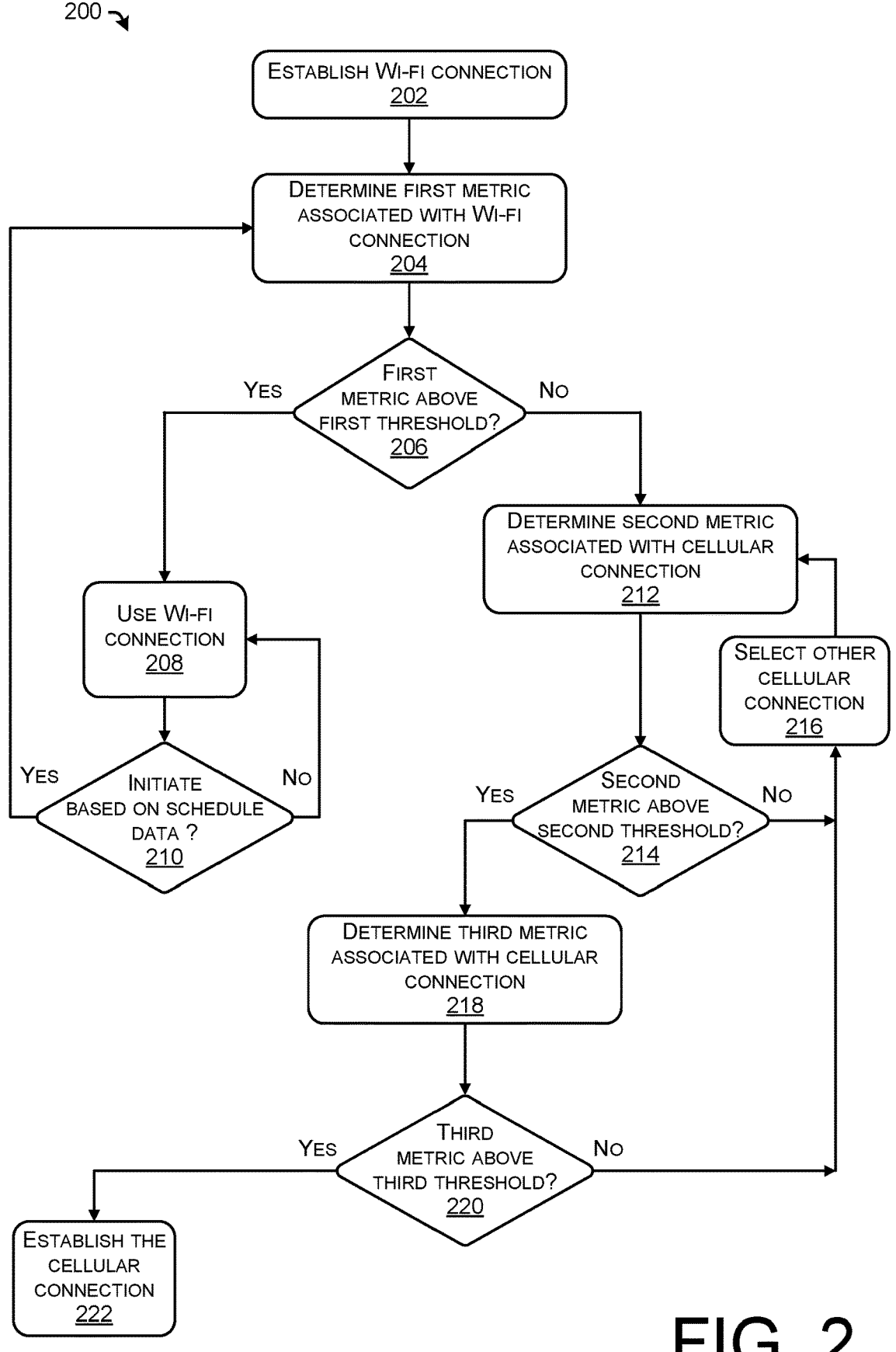
FIG. 2 illustrates an example process for determining connection metrics and selecting a wireless connection.

FIGS. 2, 5, and 6 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 2 illustrates an example process 200 for determining connection metrics and selecting a wireless connection. The example process 200 can be performed by the metrics component 110 and/or the selection component 112 of the UE 102, and/or by the device 300 comprising other various components, or another component or device as discussed herein.

At operation 202, the process can include establishing a Wi-fi connection. In some examples, the operation 202 can include providing authentication information and attaching to a Wi-fi access point, such as the access point 106.

At operation 204, the process can include determining a first metric associated with the Wi-fi connection. In some examples, the operation 204 can be based on schedule data (discussed below). In some examples, the first metric can include, but is not limited to, one or more of a speed of the Wi-fi connection, a bandwidth, a power level, an average speed over a period of time, a latency, a delay, a jitter, and the like.

At operation 206, the process can include determining whether the first metric is above a first threshold. In some examples, the threshold can be a predetermined threshold and in some examples the threshold can be determined by a machine learned model or other heuristics. For example, a machine learned model can receive UE state data and/or other network data, and can set or otherwise determine a threshold to be used in the operation 206. If the first metric is above the first threshold (operation 206: Yes) the process can continue to operation 208 where the UE can use the Wi-fi connection to send and/or receive data via the Wi-fi connection.

At operation 210, while the UE is using the Wi-fi connection to send and/or receive data via the operation 208, the process can include initiating a test for metrics based on schedule data. For example, the schedule data may indicate regular or irregular intervals to test the Wi-fi connection (at the operation 204) to continuously monitor the Wi-fi connection to determine whether to switch to another connection. In some examples, the schedule data may vary depending on the results of the first metric. For example, if the first metric is close to the first threshold the schedule data may schedule tests more frequently than if the first metric is well above the threshold (if the threshold is a speed threshold) or well below the threshold (if the threshold is a latency threshold). In some examples, if the UE is plugged in or has a high battery level, the schedule data may test more frequently. In some examples, the schedule data may balance the UE battery and/or processing power versus the performance of the Wi-fi connection to optimally evaluate performance of the connection.

If the first metric is not above the first threshold (operation 206: No), the process continues to operation 212.

At operation 212, the process can include determining a second metric associated with a cellular connection. In some examples, the operation 212 may include accessing a list of cellular connections or bands that the UE 102 has recently used. In some examples, the operation 212 may evaluate or otherwise determine metrics for different bands in the order that they were most recently accessed. For example, if the UE 102 was connected to a particular cellular connection prior to establishing the Wi-fi connection (at the operation 202), the operation 212 may include determining the second metric for that particular cellular connection.

In some examples, the operation 212 can include determining a power level of the particular cellular resource (or candidate cellular connection). For example, the operation 212 can include determining a SNR, SINR, RSSI, and the like, although the operation 212 can include determining any metrics associated with a cellular resource.

At operation 214, the process can include determining whether the second metric is above a threshold. As noted above and as discussed throughout this disclosure, in some examples the second threshold (and/or other threshold discussed herein) can be predetermined threshold, heuristics, and/or can be determined by a machine learned model. In some examples, the metrics can be input directly to a machine learned model, which can output an indication of whether the metric satisfies a condition, which may or may not include a confidence level indicating an accuracy of the prediction.

If the second metric is not above the second threshold (operation 214: No), the process can include, at operation 214, selecting or otherwise determining another cellular connection. For example, the operation 212 may include starting with a most recently accessed cellular resource and may test various resources in serial or in parallel. If, at operation 216, all of the cellular resources have been tested (or a threshold number of cellular resources have been tested, or a threshold amount of time has elapsed, etc.) the process may conclude with testing cellular resources and the UE may continue to use the Wi-fi connection.

If the second metric is above the second threshold (operation 214: Yes), the process may continue to operation 218.

At operation 218, the process can include determining a third metric associated with the cellular connection. For example, the operation 218 may include determining a speed or bandwidth of the cellular resource.

At operation 220, the process can include determining whether the third metric is above a third threshold. As discussed herein, the third threshold may be a predetermined threshold, a threshold set by a machine learned model, or the machine learned model may output an indication of whether the third metric satisfies a condition, and if so, a confidence level associated with satisfying the condition. If the third metric is not above the third threshold (operation 220: No) the process may return to 216 to select another channel (or end to continue communicating via the Wi-fi connection). If the third metric is above the third threshold (operation 220: Yes), the process may continue to operation 222.

The operation 222 can include establishing the cellular connection (e.g., that satisfied the thresholds in the operations 214 and 220). In some examples, the process 200 can include retesting the cellular connection(s) and/or the Wi-fi connections periodically based on schedule data to continuously evaluate the performance of the connections while maintaining the battery and/or processing performance of the UE.

Figure 3:
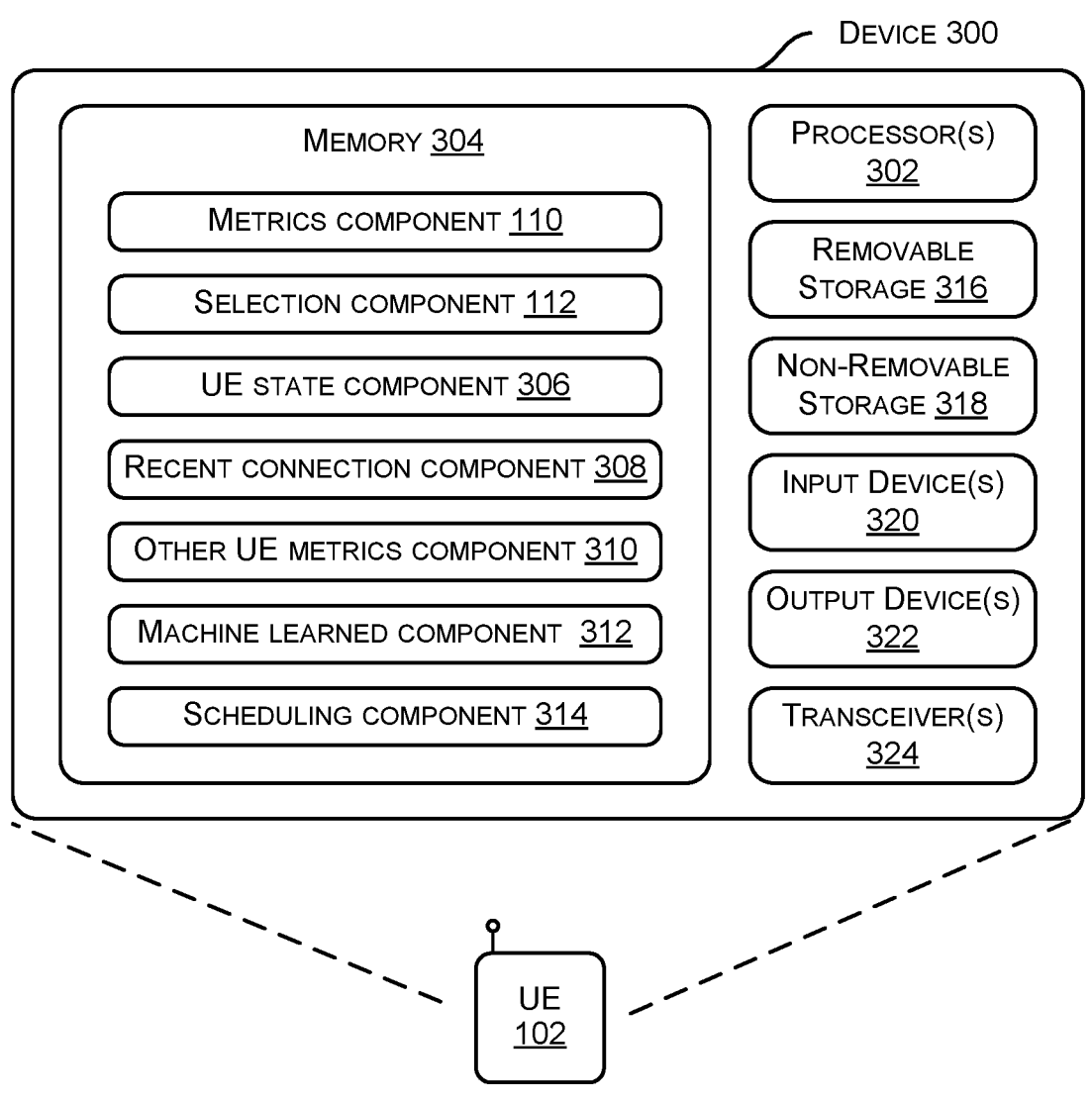
FIG. 3 illustrates a block diagram of an example device implementing the techniques discussed herein.

FIG. 3 illustrates a block diagram of an example device 300 implementing the techniques discussed herein.

FIG. 3 shows only basic, high-level components of the device 300. Generally, the device 300 may comprise and/or may be implemented in any of various network components discussed herein, including those components illustrated in FIG. 1. For example, the device 300 may be implemented as the UE 102, another UE, or as any other computing device.

In various examples, the device 300 may include processor(s) 302 and memory 304. Depending on the exact configuration and type of computing device, the memory 304 may be volatile (such as RAM), non-volatile (such as ROM, flash memory, etc.) or some combination of the two. The memory 304 may include the metrics component 110, the selection component 112, a UE state component 306, a recent connection component 308, an other UE metrics component 310, a machine learned component 312, and a scheduling component 314.

In some examples, the metrics component 110 can include functionality to measure, evaluate, test, or otherwise determine different metrics associated with one or more Wi-fi connections and/or cellular connections, as discussed herein. By way of example and without limitation, the metrics component 110 can determine one or more of a speed, bandwidth, latency, jitter, delay, signal to noise ratio (SNR), received signal strength indicator (RSSI), Channel Quality Information (CQI), signal-to-interference plus noise ratio (SINR) data, signal-to-noise plus distortion ratio (SNDR) data and the like, although other metrics (or combination of metrics) can be determined. In some examples, the metrics component 110 can select a destination location to determine a path that the metrics represent (e.g., to represented the connection between a UE and a Wi-fi access point, between a UE and a base station, between a UE and a core network, etc.).

In some examples, the selection component 112 can include functionality to determine to stay connected via an established Wi-fi connection (e.g., the connection 114) or to switch to a cellular resource (e.g., the connection 116). In some examples, the selection component 112 can determine to switch to another connection that is associated with better performance or metrics (e.g., the selection component 112 can control the UE 102 to establish the connection 116 instead of or in addition to the connection 114).

In some examples, the UE state component 306 can include functionality to receive UE state data including but not limited to, one or more of a battery level, charging status, data type (e.g., voice, data, gaming, and the like), screen state, movement data, etc.), a connection state of other UEs connected to a Wi-fi access point (e.g., indicative of whether other UEs connected to the Wi-fi access point are congested), subscriber data (e.g., data priorities, cellular data levels left within a time period, and the like), time of day, location data, roaming status, dual connectivity capability, and the like. In some examples, the UE state component 306 can increase or decrease thresholds based on heuristics associated with the various UE state data. For example, if a battery level is low or a UE is unplugged, the UE state component 306 can increase the period of time in the schedule data to test metrics for connections. By way of another example, if a UE is involved in a video call, the UE state component 306 may decrease a threshold for latency to effectuate a switch. As can be understood, these are mere examples and other implementations are contemplated within the scope of the application.

In some examples, the recent connection component 308 can include functionality to track and store the most recent cellular resources used by the UE 102. For example, the recent connection component 308 can track the N most recently used frequency bands, channels, etc., location data, IP addresses, and other information associated with such cellular resources. The UE 102 can access the list of the recently accessed wireless resources stored in the recent connection component 308 and can determine metrics associated with wireless resources in decreasing order of recency, as discussed in connection with FIG. 2 and throughout this disclosure.

Figure 4:
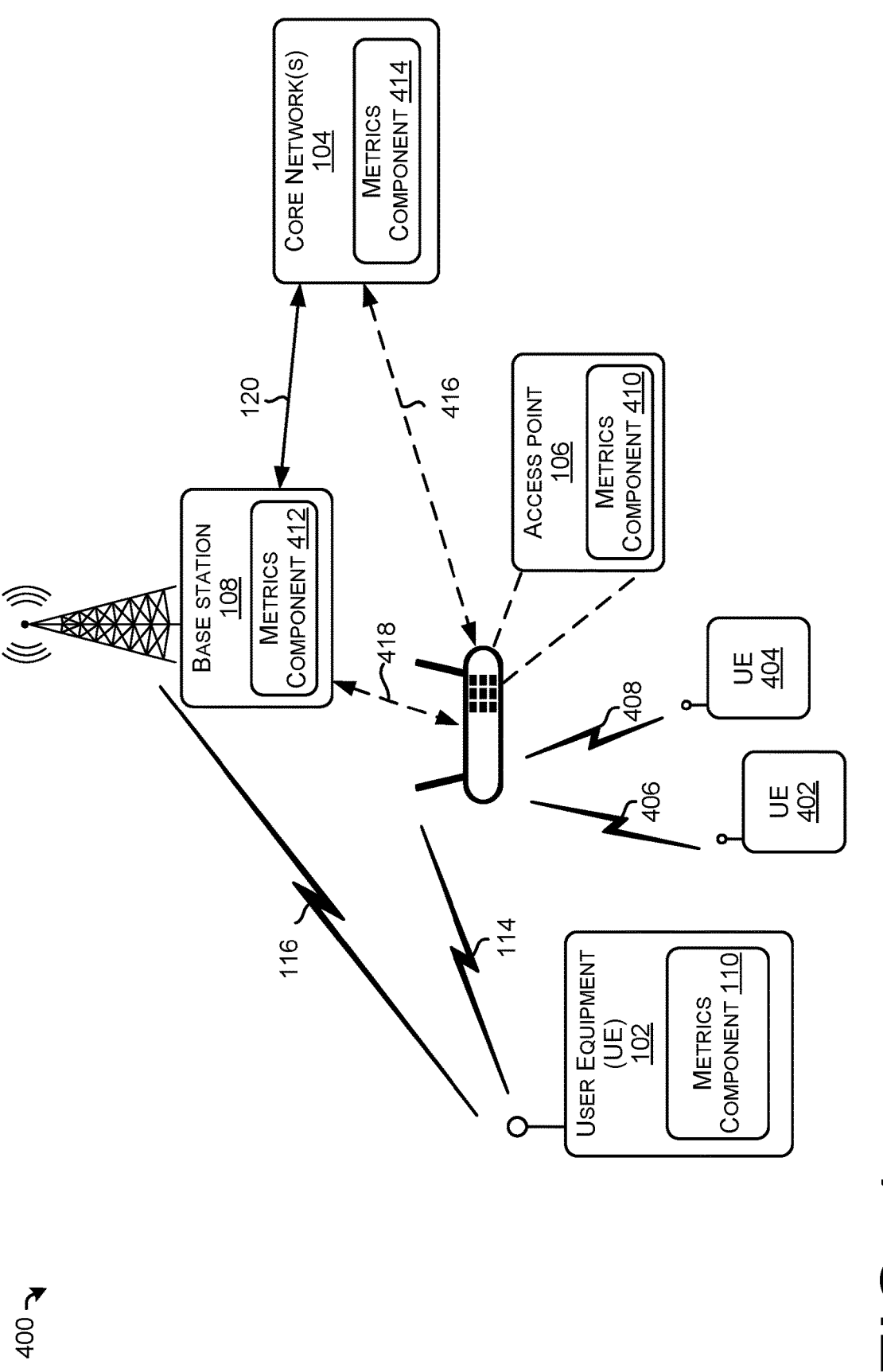
FIG. 4 shows another example network environment in which UE can connect to a core network via a Wi-Fi access point and/or via a base station.

In some examples, the other UE metrics component 310 can include functionality to receive other metrics associated with other UEs connected to a same Wi-fi access point as the device 300. For example, and as illustrated in FIG. 4, other UEs (in addition to the UE 102) may be connected to the Wi-fi access point 106. In some examples, the other UEs may include a metrics component as well and can determine metrics about speed/bandwidth/latency etc. as discussed herein. In some examples, the other UEs may or may not have the capability of connecting with other base stations. In some cases, the other UEs can transmit metrics to the other UE metrics component 310 so that the component 310 can view or otherwise determine a more wholistic view of the devices connected to a Wi-fi access point. Accordingly, if the other UE metrics component 310 gathers or otherwise determines metrics indicating that other UEs connected to the Wi-fi access point are congested or are otherwise experiencing poor performance, the component 310 can increase or decrease threshold(s) making it more or less likely for the device 300 to stay on the Wi-fi connection or to switch to a cellular connection. In this way, the component 310 can function of optimize a Wi-fi connection for other UEs as well as the device 300.

In some examples, the machine learned component 312 can include functionality to receive metric(s), UE state data, recent connection data, other UE metrics data, and the like and to output one or more thresholds, one or more indications to switch to a new wireless resource, and/or a confidence level associated with such output(s). In some examples, the machine learned component 312 can include one or more machine learned models or heuristics that can be used to determine whether to maintain a Wi-fi connection or to switch to a cellular connection, in accordance with the techniques discussed herein. For example, the machine learned component 312 can include weight(s) for various factors that can be used to set threshold(s) or likelihoods and/or determine factors that increase or decrease threshold(s) or likelihoods, and by how much.

In some examples, the scheduling component 314 can include functionality to determine a schedule triggering the metrics component 110 to determine metrics associated with a current connection (e.g., a Wi-fi connection and/or a cellular connection) and/or a candidate connection. In some examples, the scheduling component can determine metrics based on UE state (e.g., battery level, whether the UE is charging, etc.) and/or other metrics. For example, if the metrics of a current connection are relatively good the scheduling component may decrease the frequency of testing. However, if the metrics for a current connection are relatively poor the scheduling component may increase the frequency to attempt to cause the device 300 to switch to another connection. As can be understood, these are merely examples and other factors may be weighed in determining scheduling data for determining when to determine metrics for a current connection and/or a candidate connection.

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from the memory 304.

The memory 304 can also be described as non-transitory computer-readable media or machine-readable storage memory, and may include removable and non-removable media implemented in any method or technology for storage of information, such as computer executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 300 also includes additional data storage devices (removable and/or non-removable) such as, for example, magnetic disks, optical disks, or tape. Such additional storage is illustrated in FIG. 3 by removable storage 316 and non-removable storage 318. Tangible computer-readable media can include volatile and non-volatile, removable and non-removable media implemented in any method or technology for storage of information, such as computer readable instructions, data structures, program modules, or other data. The memory 304, the removable storage 316 and the non-removable storage 318 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The memory 304, the removable storage 316, and/or the non-removable storage 318 may in some cases include storage media used to transfer or distribute instructions, applications, and/or data. In some cases, the memory 304, the removable storage 316, and/or the non-removable storage 318 may include data storage that is accessed remotely, such as network-attached storage that the device 300 accesses over some type of data communications network.

In various examples, any or all of the memory 304, the removable storage 316, and/or the non-removable storage 318 may store programming instructions that, when executed, implement some or all of the function functionality described herein.

The device 300 also can include input device(s) 320, such as a keypad, a cursor control, a touch-sensitive display, voice input device, etc., and output device(s) 322 such as a display, speakers, printers, etc. These devices are well known in the art and need not be discussed at length here.

As illustrated in FIG. 3, the device 300 also includes one or more wired or wireless transceiver(s) 324. For example, the transceiver(s) 324 can include a network interface card (NIC), a network adapter, a LAN adapter, or a physical, virtual, or logical address to connect to various networks, devices, or components illustrated in figures herein. To increase throughput when exchanging wireless data, the transceiver(s) 324 can utilize multiple-input/multiple-output (MIMO) technology. The transceiver(s) 324 can comprise any sort of wireless transceivers capable of engaging in wireless, radio frequency (RF) communication. The transceiver(s) 324 can also include other wireless modems, such as a modem for engaging in Wi-Fi, WiMAX, Bluetooth, infrared communication, and the like.

FIG. 4 shows another example network environment 400 in which the UE 104 can connect to a core network 104 via a Wi-Fi access point 106 and/or via a base station 108.

In some examples, the UE 102 can be connected to the access point 106 via the Wi-fi connection 114 and can evaluate switching to the cellular connection 116 in accordance with the techniques discussed herein. In some examples, other UEs 402 and 404 can be communicatively coupled to the Wi-fi access point 106 via Wi-fi connections 406 and 408, respectively. In some examples, the UEs 402 and/or 404 may include some or all of the functionality of the device 300 and/or the UE 102. That is, the UEs 402 and/or 404 may include metrics components 110, selection components 112, and the like.

As illustrated, and in some examples, the access point 106 may include a metrics component 410. In some examples, the base station 108 can include a metrics component 412. And the core network(s) 104 can include a metrics component 414.

In some examples, the access point 106 can be communicatively connected to the core network(s) 104 via a wired connection 416 and/or via a wireless connection (e.g., a cellular connection) 418.

By way of example, and without limitation, the environment 400 is illustrated to show a few concepts. One exemplary concept is that various devices of the environment 400 can include metrics components (e.g., the metrics component 410, 412 and 414) such that the metrics component 110 of UE 102 can selectively address a signal to the various components to determine different metrics associated with different portions of the network.

Another exemplary concept is that the access point 106 may be coupled to the base station 108 via the cellular connection 418. In some examples, the cellular connection 418 may be the same or similar cellular connection as the cellular connection 116. In such an example, and as discussed in more detail in connection with FIG. 5, the UE 102 can determine that the UE 102 may be served by the same base station 108 as the access point 106. Accordingly, the UE 102 can communicate with the metrics component 410 to determine local congestion at the access point 106 and can switch to the cellular connection 116 to avoid location congestion.

Another exemplary concept is that multiple UEs 102, 402, and 404 may be connected to the access point 106 at a same time. The UEs 402 and 404 may determine metrics associated with their respective connections 406 and 408 and can transmit or otherwise send their metrics to the UE 102 (e.g., to the other UE metrics component 310). The UE 102 can determine that there is local congestion associated with the access point 106 and can adjust thresholds associated with speed, bandwidth, and/or latency to increase the likelihood that the UE 102 will switch to the cellular connection 116. In some examples, the UEs 402 and/or 404 can send capability information to the UE 102 indicating whether the UEs 402 and/or 404 are capable of communicating with the base station 108 (e.g., whether the UEs 402 and/or 404 are capable of using a cellular connection). If not, the UE 102 may adjust one or more threshold to increase the likelihood that the UE 102 may switch to the cellular connection 116, which may reduce congestion at the access point 106. Accordingly, the techniques discussed herein may be used to optimize network performance for a plurality of UEs 102, 402, and/or 404 connected to the access point 106.

FIG. 5 illustrates an example process 500 of UE operations based on radio frequency data received from a Wi-Fi access point. The example process 500 can be performed by the metrics component 110 and/or the selection component 112 of the UE 102, and/or by the device 300 comprising other various components, or another component or device as discussed herein.

At operation 502, the process can include receiving, at a UE and from a Wi-fi access point with a wireless connection to a base station, radio frequency (RF) data indicative of the wireless connection. For example, the operation 502 can include receiving an indication that the access point 106 is connected to the base station 108 via a cellular connection 418 (and an indication of the radio access technology (e.g., 4G, 5G, etc.) and/or a particular band or channel used for the cellular connection 418).

At operation 504, the process can include determining that the UE is connected to the Wi-fi access point via a Wi-fi connection. In some examples this operation 504 can include comparing a current SSID associated with the Wi-fi connection to a stored SSID to determine that the UE is connected to the particular Wi-fi access point. In some examples, the operation 504 can include comparing a stored MAC address with a current MAC address, or comparing any unique identifier to determine that UE is connected to the access point that is associated with the data stored or received in the operation 502.

At operation 506, the process can include determining that a recent wireless resource used by the UE is associated with the RF data. In some examples, this can include determining that the UE has previously used the cellular resource associated with the RF data used by the access point, meaning that the UE has recently used the cellular connection used by the Wi-fi access point. In practice, this may mean that there is a high likelihood that the UE may use the same cellular connection as the access point if the UE were to switch to using a cellular connection.

At operation 508, the process can include determining a test to initiate based on the recent wireless resource used by the UE being associated with the RF data. By way of example, the operation 508 can include determining a type of test (e.g., a speed test, a bandwidth test, a latency test, SNR, SINR, etc.) for a Wi-fi connection. Further, the operation 508 can include determining a counterpart metrics component to conduct the test with (e.g., the UE 102, including the metrics component 110, can determine to run a test with one or more of the metrics components 410, 412, and/or 414). By way of example and without limitation, the UE 102 can determine to conduct a latency test between the metrics component 110 and the metrics component 410, which may provide an indication of the congestion level associated with the access point 106. Of course, other examples are contemplated herein.

At operation 510, the process can include determining a cellular resource to test for a second connection based on the RF data. For example, the UE 102 can determine to test a cellular connection that uses or corresponds to the RF data being used by the access point 106. In this manner, the techniques allow for efficient testing of RF resources to quickly determine the state of the various wireless connections and to quickly evaluate other wireless resources to determine whether to switch to a new connection.

FIG. 6 illustrates another example process 600 for determining connection metrics and selecting a wireless connection. The example process 600 can be performed by the metrics component 110 and/or the selection component 112 of the UE 102, and/or by the device 300 comprising other various components, or another component or device as discussed herein.

At operation 602, the process can include establishing a first connection with a Wi-fi access point. For example, the operation 602 can include coming within range of a Wi-fi access point to automatically establish a connection (e.g., if authentication credentials are saved on a UE) or a user manually connecting to a Wi-fi access point.

At operation 604, the process can include determining that a first connection metric associated with the first connection does not satisfy a first condition. In some examples, the first connection metric can be a speed metric, a bandwidth metric, and/or a latency metric, and in some examples not satisfying the first condition can be failing to meet or exceed a speed threshold or a bandwidth threshold, or exceeding a latency threshold, depending on the metric.

At operation 606, the process can include determining that a second connection metric associated with a cellular connection satisfies a second connection. In some examples, the second connection metric can be a power level, a speed metric, a bandwidth metric, a SNR metric, a SINR metric, a latency metric, and the like. Further, a second condition can be a respective threshold.

At operation 608, the process can include establishing a second connection with the cellular connection. As can be understood, the operation 608 can be performed in response to the first connection metric failing to satisfy the first condition and the second connection metric satisfying the second condition.

At operation 610, the process can include sending and/or receiving data via the second connection. Accordingly, the UE can optimize a connection for efficient data transfer with minimal network congestion and extraneous signaling.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. A method comprising:
establishing, by a user equipment (UE), a first connection with a Wi-Fi access point;
determining a first connection metric associated with the first connection;
determining connection data indicating that one or more other UEs are currently connected to the Wi-Fi access point and including one or more connection metrics associated with one or more connections between the one or more other UEs and the Wi-Fi access point;
determining a first speed threshold based at least in part on the connection data;
determining that the first connection metric is below the first speed threshold;
determining, by the UE and based at least in part on the first connection metric being below the first speed threshold, a second connection metric associated with at least one of a Fourth Generation (4G) connection or a Fifth Generation (5G) connection;
determining that the second connection metric meets or exceeds a power threshold;
determining, based at least in part on the second connection metric meeting or exceeding the power threshold, a third connection metric associated with the at least one of the 4G connection or the 5G connection;
determining that the third connection metric meets or exceeds a second speed threshold;
establishing a second connection with the at least one of the 4G connection or the 5G connection based at least in part on the third connection metric meeting or exceeding the second speed threshold; and
at least one of sending or receiving data via the second connection.

2. The method of claim 1, wherein determining the second connection metric comprises determining a most recently accessed band of the at least one of the 4G connection or the 5G connection.

3. The method of claim 1, wherein determining the first connection metric comprises sending a signal to a program executing on the Wi-fi access point.

4. The method of claim 1, further comprising:
determining UE state data associated with the first connection;
inputting the UE state data to a machine learned model; and
receiving, from the machine learned model, at least one of the first speed threshold, the power threshold, or the second speed threshold.

5. The method of claim 1, further comprising:
determining a latency metric associated with the first connection;
determining that the latency metric meets or exceeds a latency threshold; and
determining the first connection metric based at least in part on the latency metric meeting or exceeding the latency threshold.

6. The method of claim 1, wherein determining the first speed threshold comprises increasing or decreasing a previously determined speed threshold based at least in part on the connection data.

7. The method of claim 1, further comprising:
accessing a list of cellular resources accessed by the UE within a period of time; and
determining that the at least one of the 4G connection or the 5G connection are most recently accessed cellular resources included in the list of cellular resources.

8. The method of claim 1, further comprising:

maintaining schedule data indicating intervals at which to test connections between UEs and the Wi-Fi access point; and determining to adjust the intervals based at least in part on an extent to which connection metrics associated with the connections are above or below the first speed threshold.

9. A user equipment (UE) comprising:

one or more processors; and one or more non-transitory computer readable media storing computer executable instructions that, when executed, cause the one or more processors to perform operations comprising:

establishing, by the UE, a first connection with a Wi-fi access point;

determining a first connection metric associated with the first connection;

determining connection data indicating that one or more other UEs are currently connected to the Wi-Fi access point and including one or more connection metrics associated with one or more connections between the one or more other UEs and the Wi-Fi access point;

determining a first threshold based at least in part on the connection data;

determining that the first connection metric is below the first threshold;

determining, by the UE and based at least in part on the first connection metric being below the first threshold, a second connection metric associated with a cellular connection;

determining that the second connection metric meets or exceeds a power threshold;

determining, based at least in part on the second connection metric meeting or exceeding the power threshold, a third connection metric associated with the cellular connection;

determining that the third connection metric meets or exceeds a speed threshold;

establishing a second connection with the cellular connection based at least in part on the third connection metric meeting or exceeding the speed threshold; and at least one of sending or receiving data via the second connection.

10. The UE of claim 9, wherein:

the cellular connection is at least one of a Fourth Generation (4G) connection of a Fifth Generation (5G) connection; and determining the second connection metric comprises determining a most recently accessed band of the at least one of the 4G connection or the 5G connection.

11. The UE of claim 9, wherein the first threshold comprises at least one of:

a link speed threshold;

a signal-to-noise ratio (SNR) threshold;

a received signal strength indicator (RSSI) threshold; or a latency threshold.

12. The UE of claim 9, wherein:

the Wi-fi access point is connected to a core network via a base station of one or more base stations; and the cellular connection comprises a connection with the one or more base stations.

13. The UE of claim 9, wherein determining the first connection metric comprises:

sending a first signal to a first program executing on at least one of a base station associated with the Wi-fi access point or a component associated with a core network; and sending a second signal to a second program executing on the Wi-fi access point.

14. The UE of claim 9, the operations further comprising:

determining UE state data associated with the first connection;

inputting the UE state data to a machine learned model; and receiving, from the machine learned model, at least one of the first threshold, the power threshold, or the speed threshold.

15. The UE of claim 9, wherein determining the first threshold comprises increasing or decreasing a previously determined threshold based at least in part on the connection data.

16. The UE of claim 9, the operations further comprising:

repeatedly determining the first connection metric associated with the first connection based at least in part on scheduling data.

17. One or more non-transitory computer readable media storing computer executable instructions that, when executed, cause one or more processors to perform operations comprising:

establishing, by a user equipment (UE), a first connection with a Wi-fi access point;

determining a first connection metric associated with the first connection;

determining connection data indicating that one or more other UEs are currently connected to the Wi-Fi access point and including one or more connection metrics associated with one or more connections between the one or more other UEs and the Wi-Fi access point;

determining a first threshold based at least in part on the connection data;

determining that the first connection metric is below the first threshold;

determining, by the UE and based at least in part on the first connection metric being below the first threshold, a second connection metric associated with a cellular connection;

determining that the second connection metric meets or exceeds a power threshold;

determining, based at least in part on the second connection metric meeting or exceeding the power threshold, a third connection metric associated with the cellular connection;

determining that the third connection metric meets or exceeds a speed threshold;

establishing a second connection with the cellular connection based at least in part on the third connection metric meeting or exceeding the speed threshold; and at least one of sending or receiving data via the second connection.

18. The one or more non-transitory computer readable media of claim 17, wherein the first threshold comprises at least one of:

a link speed threshold;

a signal-to-noise ratio (SNR) threshold;

a received signal strength indicator (RSSI) threshold; or a latency threshold.

19. The one or more non-transitory computer readable media of claim 17, wherein determining the first connection metric comprises sending a signal to a program executing on the Wi-fi access point, wherein:

the Wi-fi access point is connected to a core network via a base station of one or more base stations; and the cellular connection comprises a connection with the one or more base stations.

20. The one or more non-transitory computer readable media of claim 17, the operations further comprising:

determining UE state data associated with the first connection;

inputting the UE state data to a machine learned model; and receiving, from the machine learned model, at least one of the first threshold, the power threshold, or the speed threshold.

* * * * *